(12) United States Patent
Sparks et al.

(10) Patent No.: US 6,408,492 B1
(45) Date of Patent: Jun. 25, 2002

(54) HOLDER FOR SLENDER ELONGATED ARTICLES SUCH AS FISHING ROD SECTIONS

(76) Inventors: Ronald V. Sparks; Sharon Lee Sparks, both of 320 SE. Hale Dr., Gresham, OR (US) 97030

( * ) Notice: Subject to any disclaimer, the term of this patent is extended or adjusted under 35 U.S.C. 154(b) by 0 days.

(21) Appl. No.: 07/170,932

(22) Filed: Mar. 21, 1988

(51) Int. Cl.$^7$ ............................................. A44B 21/00
(52) U.S. Cl. ..................... 24/336; 24/10 R; 24/16 R; 24/532; 248/68.1; 248/74.2; 403/391
(58) Field of Search ........................ 24/3 A, 3 F, 10 R, 24/11 CC, 16 R, 16 PB, 18, 329, 336, 338, 339, 121, 129 R, 129 D, 457, 532, 148, 545, 546, 547, 556, 562; 43/54.1, 18.1, 21.2, 25.2; 403/391; 248/68.1, 74.1, 74.2

(56) References Cited

U.S. PATENT DOCUMENTS

| | | | | |
|---|---|---|---|---|
| 1,274,312 A | * | 7/1918 | Nicoll | 24/34 |
| 1,289,631 A | * | 12/1918 | Brock | 24/336 X |
| 1,671,555 A | * | 5/1928 | Skultety | 24/10 R |
| 2,733,290 A | * | 1/1956 | Valiulis | 248/68.1 X |
| D190,429 S | * | 5/1961 | Hoagland | 248/68.1 X |
| 3,251,069 A | * | 5/1966 | Clark | 24/336 X |
| 3,521,332 A | * | 7/1970 | Kramer | 248/74.2 X |
| 3,543,355 A | * | 12/1970 | Wyckoff et al. | 24/562 X |
| 4,550,891 A | * | 11/1985 | Schaty | 248/74.2 X |
| 4,707,892 A | * | 11/1987 | Nelson | 24/336 |

* cited by examiner

Primary Examiner—Kenneth J. Dorner
Assistant Examiner—Laurie K. Cranmer

(57) ABSTRACT

The holder is a resilient arcuate clip of a size to fit on the handle section of a fishing rod. Outstanding therefrom is a series of resilient arcuate clips of different sizes to grip the smaller rod sections, whereby all the rod sections are held close together in side-by-side relation in a compact bundle.

1 Claim, 1 Drawing Sheet

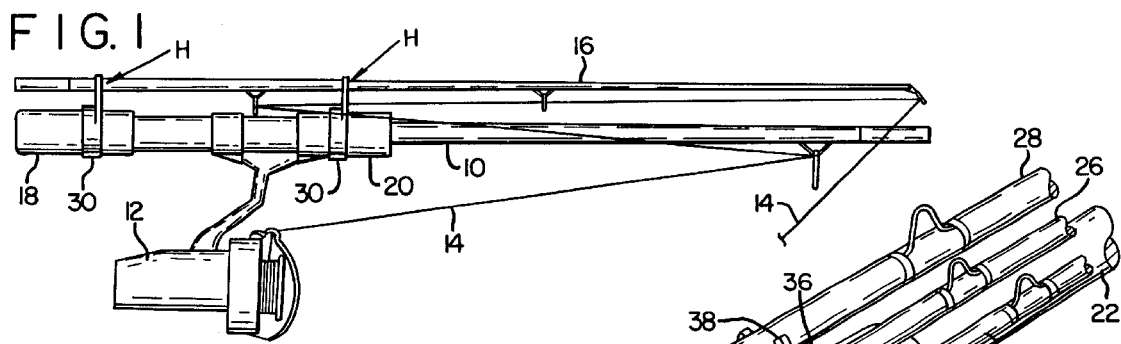
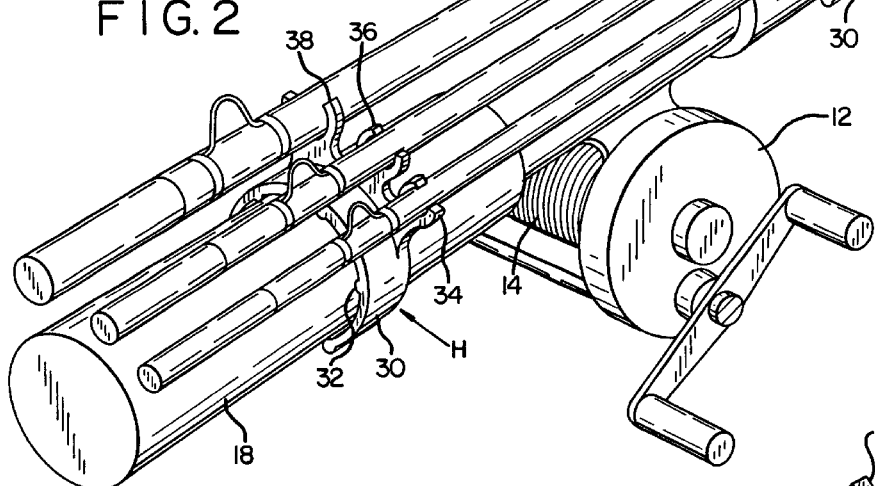
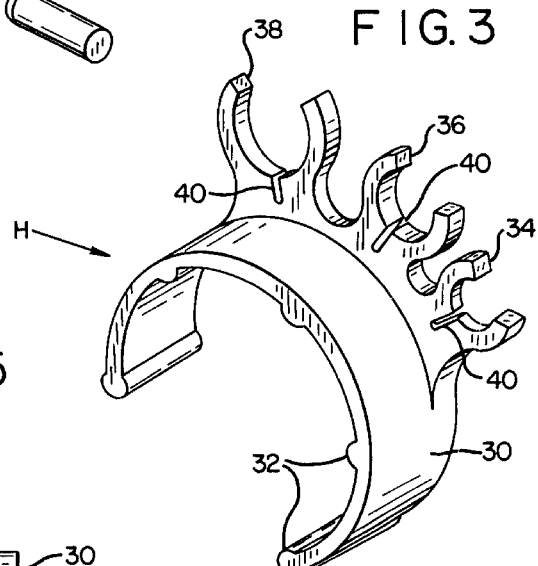
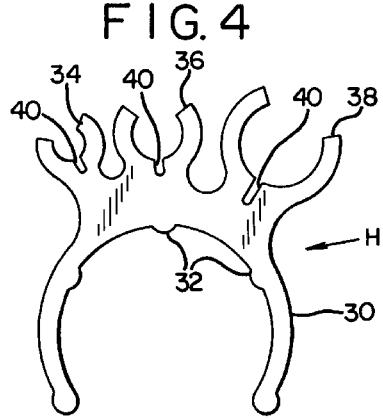
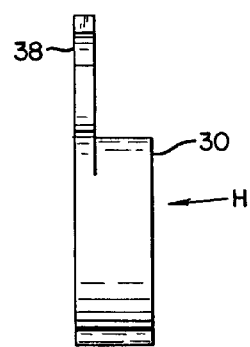

HOLDER FOR SLENDER ELONGATED ARTICLES SUCH AS FISHING ROD SECTIONS

BACKGROUND OF THE INVENTION

This invention relates to a holder for slender elongated articles such as fishing rod sections.

The usual practice is to carry fishing rod sections loosely in a bag or pouch, requiring the fishing line to be withdrawn from the rod sections and wound on the reel.

This can be very inconvenient, especially in moving from place to place through underbrush along a stream or along the shore of a lake where the rod cannot be carried fully assembled and ready for fishing.

There is a need for a better arrangement for carrying fishing rod sections in such manner that they can be easily and quickly assembled, and not require the line to be removed from each section.

Although such advantages are particularly desirable for fishing rods, the invention is of more general application and is not limited to fishing rods.

SUMMARY OF THE INVENTION

The present holder comprises a pair of resilient arcuate clips to be attached to the handle section of a fishing rod. These clips have smaller resilient outstanding clips of different sizes to hold 1, 2 or 3 additional rod sections in compact side-by-side relation to the handle section.

This arrangement does not require the fishing line to be removed from the rod sections when they are mounted in the clips. The rod sections, still carrying the fishing line, are merely removed from the clips and connected together without the necessity of threading the line to the rod sections one after another. This is a great convenience when the fisherman frequently moves from place to place to find a good fishing location.

The invention will be better understood and additional features and advantages will become apparent from the following description of the preferred embodiment illustrated in the accompanying drawings. Various changes may be made in the details of construction and arrangement of parts and certain features may be used without others. All such modifications within the scope of the appended claims are included in the invention.

BRIEF DESCRIPTION OF THE DRAWING

FIG. 1 is a side elevation view showing the present holder applied to a two section fishing rod.

FIG. 2 is a perspective view showing the holder applied to a four section fishing rod.

FIG. 3 is a perspective view of the holder.

FIG. 4 is an end elevation view of the holder.

FIG. 5 is a side elevation view of the holder.

DESCRIPTION OF THE PREFERRED EMBODIMENT

FIG. 1 shows a conventional fishing rod having a handle section 10 with a reel 12 and line 14. Above handle section 10 is outer end section 16, mounted in a pair of holders H which are in turn mounted on resilient cork sections 18 and 20 of the handle section of the rod.

With the end rod section 16 already carrying the line 14, all that is necessary to assemble the equipment for fishing is to remove end section 16 from the holders H and insert the end section into the outer end of handle section 10. There is no removal of line 14 from end rod section 16 when this section is mounted in the holders H, whereby the line does not have to be threaded through the line guides in section 16, when this section is assembled on the handle section.

In FIG. 2, the fishing rod comprises a handle section 22, a tip end section 24, and two intermediate sections 26 and 28. The three rod sections 24, 26 and 28 are carried side-by-side by a pair of holders H as in FIG. 1. The line 14 is not shown on the three sections 24, 26 and 28, but the line could be retained in place with these three sections if desired.

The details of the holder or clip H are shown in FIGS. 3, 4 and 5. The holder is made in one-piece unitary construction of a resilient material, such as nylon having an arcuate springy base portion 30. A series of axial protrusions 32 project inward from base portion 30 to provide a secure grip on the relatively soft cork handle portions 18 and 20 on the rod. Outstanding from base portion 30 are a small resilient arcuate clip 34 of a size to grip the small rod portion 24, a clip 36 of intermediate size to grip the rod section 26 and a larger clip 38 of a size to grip the rod section 28.

The arcuate extent of base portion 30 slightly exceeds 180 degrees and the arcuate extent of each clip 34, 36, and 38 also slightly exceeds 180 degrees. To enhance its springy gripping action each clip 34, 36, and 38 has a radial slot 40 in its base portion, whereby these clips are not limited to rod sections of particular diameters. The clips 34, 36 and 38 are much thinner in an axial direction than base portion 30 to make them sufficiently flexible to adequately grip rod sections varying in size, particularly since the rod sections are tapered and not of constant diameter.

What is claimed is:

1. A holder for fishing rod sections comprising a body of resilient material having an arcuate base portion slightly exceeding 180° in arcuate extent, a plurality of radial protrusions extending axially on the inside arcuate surface of said arcuate base portion to grip a handle portion of a fishing rod, and a plurality of arcuate clips of different sizes outstanding from said base portion in radial directions side by side in a common plane perpendicular to the central axis of said arcuate base portion for holding fishing rod sections, the thickness of said clips in an axial direction being a small fraction of the thickness in an axial direction of said base portion, and all of said clips having one face in a common plane with one axial end of said base portion and an opposite face between the axial ends of said base portion.

* * * * *